United States Patent [19]
Lintula et al.

[11] Patent Number: 5,884,190
[45] Date of Patent: Mar. 16, 1999

[54] METHOD FOR MAKING A DATA TRANSMISSION CONNECTION FROM A COMPUTER TO A MOBILE COMMUNICATION NETWORK FOR TRANSMISSION OF ANALOG AND/OR DIGITAL SIGNALS

[75] Inventors: Olli-Pekka Lintula, Helsinki; Petri Tapig Nykánen, Tampere; Arto Juhani Suomi, Tampere, all of Finland

[73] Assignee: Nokia Mobile Phones, Salo, Finland

[21] Appl. No.: 663,330

[22] Filed: Jun. 7, 1996

[30] Foreign Application Priority Data

Jun. 8, 1995 [FI] Finland ..................................... 952814

[51] Int. Cl.[6] ..................................................... H04Q 7/20
[52] U.S. Cl. .......................... 455/557; 455/556; 455/552; 364/705.05
[58] Field of Search ....................... 364/705.05; 455/556, 455/552, 553, 424, 558, 557

[56] References Cited

U.S. PATENT DOCUMENTS

| | | | |
|---|---|---|---|
| 5,127,041 | 6/1992 | O'Sullivan | 455/557 |
| 5,450,472 | 9/1995 | Brax | 455/557 |
| 5,696,699 | 12/1997 | Nair | 455/422 |

*Primary Examiner*—Edward F. Urban
*Assistant Examiner*—Tilahun Gesesse
*Attorney, Agent, or Firm*—Perman & Green, LLP

[57] ABSTRACT

In a method for making a data transmission connection from a computer to a mobile communication network for transmission of analog and/or digital signals, the computer is connected to the mobile communication network by means of a telecommunication terminal which is in local data transmission connection with the computer. The telecommunication terminal utilizes at least a first operation mode and a second operation mode for connection to different types of mobile communication networks. There is testing to determine which operation modes of the telecommunication terminal are available in the mobile communication network. One of the operation modes of the telecommunication terminal available in the mobile communication network is selected for connecting the communication terminal to the mobile communication network. The telecommunication terminals set in the selected operation mode, and a data transmission connnection is set according to the selected operation mode.

25 Claims, 12 Drawing Sheets

METHOD FOR MAKING A DATA TRANSMISSION CONNECTION FROM A COMPUTER TO A MOBILE COMMUNICATION NETWORK FOR TRANSMISSION OF ANALOG AND/OR DIGITAL SIGNALS

BACKGROUND OF THE INVENTION

The invention relates to a method for making a data transmission connection from a computer to a mobile communication network for transmission of analog and/or digital signals, wherein the computer is connected with the mobile communication network with a telecommunication terminal which is in local data transmission connection with the computer. The telecommunication terminal utilises at least a first operation mode for connection with a first telecommunication network and a second operation mode for connection with a second telecommunication network.

The number of computers, such as personal computers (PC), is still increasing very rapidly. Computers are used in an increasing number of jobs to make tasks easier and faster to perform. Recently also the properties of so-called portable computers have been developed so that they correspond to desk-top computers in capacity but are considerably smaller in size. This has contributed to the popularity of portable computers particularly on travels. Increased use of computers has also resulted in the growing need for data transmission between computers. In many cases, computers between which data transmission is needed are located far from each other geographically, wherein advantageously a telecommunication network must be used for data transmission. Thus, the computer requires a connection device (data adapter, for example modem) for connecting the computer with a telecommunication terminal connected with a telecommunication network. In landline telecommunication networks, the data adapter can also be used as a telecommunication terminal which can be connected directly to the telecommunication network.

Landline telecommunication networks are primarily analog or digital telecommunication networks. Also mobile communication networks can be divided into analog and digital mobile communication networks. Because different types of telecommunication networks have different technical properties, this must be considered when connecting a data adapter with a computer. Generally, each telecommunication network type requires a data adapter designed precisely for that telecommunication network. Particularly in the case of portable computers, there is often a need for using the computer at different locations, whereby the user does not necessarily know what kind of a telecommunication network is available. For avoiding this problem, the portable computer should thus be equipped with a sufficient number of different data adapters to enable connecting the computer with the local telecommunication network.

Recently, mobile stations have been developed which can be connected with both analog and digital telecommunication networks. The range of use of such a mobile station can thus be expanded. Even in this case, problems may arise upon connecting a computer with the telecommunication network, because the type of network may change during the transmission from one telecommunication network area to another, whereby also the data adapter card connected with the computer should be replaced by one of the correct type. This may require unnecessary tries, because the user may not know what type of a telecommunication network is available in the area of the user.

U.S. Pat. No. 5,249,218 presents a data adapter by means of which a computer can be connected with both a landline telecommunication network and a mobile communication network. The data adapter is connected with a telecommunication terminal via a suitable connector and a cable. The data adapter identifies the type of the telecommunication terminal by signals received through the connector, if identification signals of the said telecommunication terminal are recorded in the memory of said data adapter. Next, a driver software is loaded in the data adapter, the driver software being compatible with the telecommunication terminal and allowing a data transmission connection from the computer to a telecommunication network. However, one disadvantage of the data adapter disclosed in the above U.S. Patent is that it does not take into account mobile stations which can be used in different types of mobile telecommunication networks, such as in analog and digital mobile telecommunication networks. In such a case a data transmission connection is not necessarily achieved.

SUMMARY OF THE INVENTION

For eliminating the above-mentioned disadvantages and for raising the level of prior art in the field, it is an aim of the present invention to provide a novel method for making a data transmission connection from a computer to a mobile communication network for transmission of analog and/or digital signals.

The invention is based on the idea that there is a testing to determine to which telecommunication networks a connection can be made from the telecommunication terminal, after which one of the available mobile communication networks is selected and the telecommunication terminal is set into an operation mode corresponding to the selected mobile communication network. Next, a data transmission connection is set from the computer to the mobile communication network according to the operation mode selected in the telecommunication terminal, wherein a data transmission connection is formed from the computer to the mobile communication network. The operation mode is selected primarily by the telecommunication terminal, or also by the user or by an application used in the computer, if necessary.

The method according to the invention is characterized in that it is tested, to which mobile communication networks a connection can be made with the telecommunication terminal, one of the available mobile communication networks is selected, the telecommunication terminal is set into an operation mode corresponding to the selected mobile communication network, and the data transmission connection is set according to the selected operation mode.

The invention provides considerable advantages. By using the method of the invention, the formation of the data transmission connection can be automated, wherein the user does not need to take care of the selection and installation of a suitable data adapter card. Further, the data adapter according to the invention can be arranged in an advantageous manner as a single integrated unit, wherein the number of separate data adapter cards to be carried with the computer can be minimised.

According to the fourth embodiment of the invention, using a data adapter consisting of several data adapter cards gives the advantage that it is possible to utilise already existing data adapter cards for carrying out the invention, wherein the selection of the data adapter card to be used in the data transmission connection can be advantageously made by a selection logic.

BRIEF DESCRIPTION OF THE DRAWING

The invention will be described more closely below with reference to the appended drawings, in which.

DETAILED DESCRIPTION OF THE INVENTION

Figure 1:
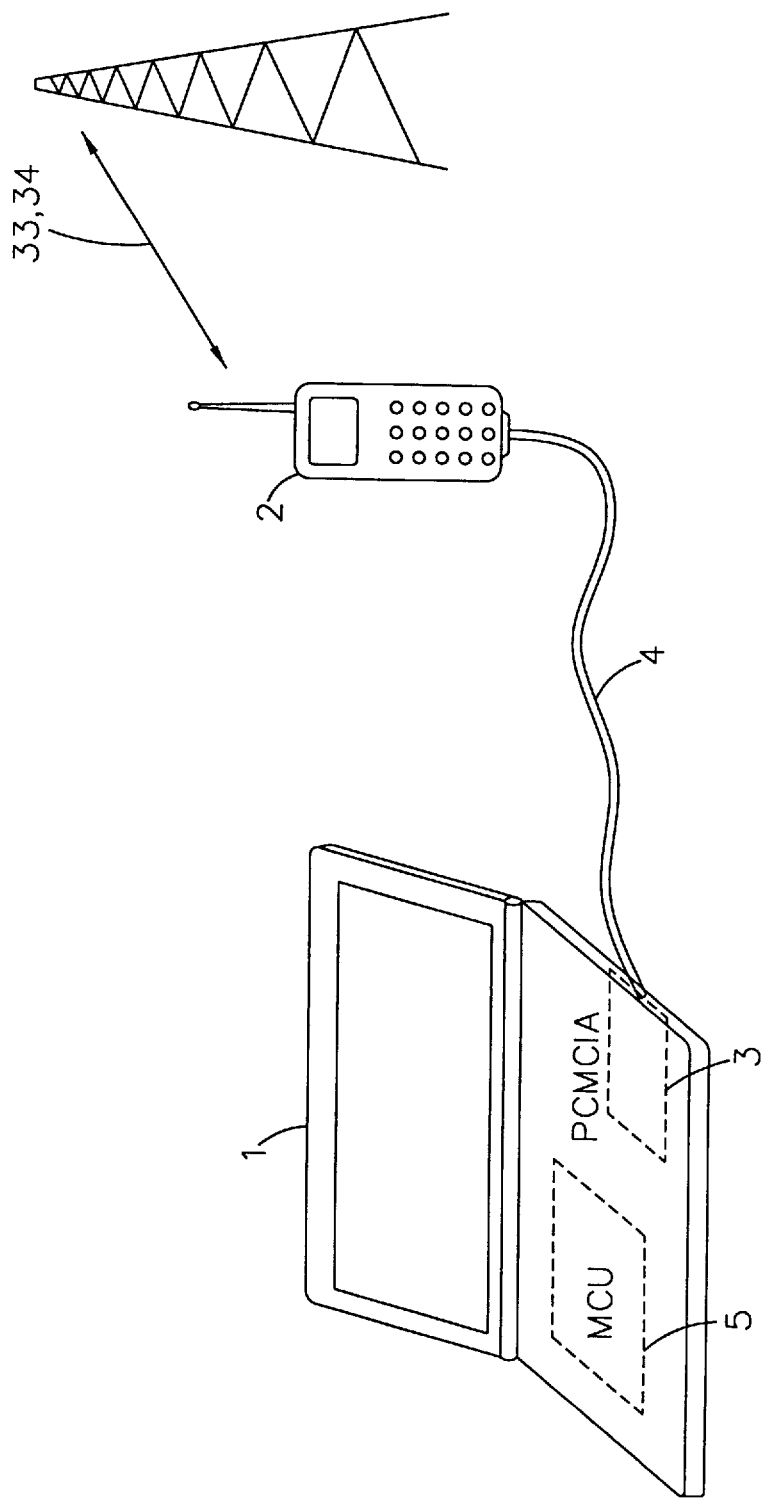
FIG. 1 shows the composition of an apparatus according to the first and third embodiments of the invention in a reduced schematic form.

FIG. 1 illustrates a first embodiment of the method according to the invention, the computer 1 being a portable computer. The computer 1 is connected to a telecommunication terminal by a data adapter unit 3 and a connection cable 4. In this embodiment, the telecommunication terminal 2 is a mobile station with two operation modes for forming a data transmission connection, whereby the first operation mode can be used upon entering a first telecommunication network 33 and the second operation mode can be used upon entering a second telecommunication network 34. The first operation mode is an analog operation mode for entering an analog mobile communication network and the second operation mode is a digital operation mode for entering a digital mobile communication network. However, the invention is not limited to dual-mode telecommunication terminals only, but it can be advantageously applied also in telecommunication terminals with several operation modes. Further, the invention can be applied in telecommunication terminal using two or several digital operation modes, such as GSM (Group Special Mobile), PDC (Personal Digital Communication), DECT (Digital European Cordless Telecommunications), PHS (Personal Handy Phone), Wireless ATM (Asynchronous Transfer Mode), or PCS+AMPS (Advanced Mobile Phone Service). Some other potential operation modes are operation modes suitable for mobile communication networks based on TDMA (Time Division Multiple Access), CDMA (Code Division Multiple Access) and FDMA (Frequency Division Multiple Access) techniques.

In the embodiment of FIG. 1, the data adapter unit 3 is a so-called PCMCIA (Personal Computer Memory Card International Association) card, because this type of a card can be connected to almost all portable computers. The connection cable 4 is used advantageously with a connector that is suitable for the telecommunication terminal 2 and whose structure can vary for different types of a telecommunication terminal 2. When forming a local data transmission connection, also wireless data transmission methods known as such can be used, e.g. infrared, inductive or radio connection.

In the first embodiment according to the invention, the first operation mode of the telecommunication terminal 2 can be used for both audio and data connections, and the second operation mode can be used both in asynchronous data communication and in facsimile transmissions. The mobile communication network 33, 34 informs the telecommunication terminal 2 about the different operation modes available for forming a connection.

For forming a connection, the telecommunication terminal 2 transmits a service request to the mobile communication network 33, 34. The service request can be advantageously one of the following:

I. an analog audio connection,

II. a digital audio connection,

III. an analog audio connection preferred, but also a digital audio connection accepted, IV. a digital audio connection preferred, but also an analog audio connection accepted, and V. a digital data connection, such as asynchronous data and/or fax.

A connection is possible in situations where the service request corresponds to the operation modes available in the mobile communication network 33, 34. For example when the telecommunication terminal sends a service request to the mobile communication network 33, 34 for forming an analog audio connection, making the connection is only possible if the first operation mode is available in the mobile communication network 33, 34. If a service request I or II has been used when forming the connection, a channel exchange between a digital and analog channel is not possible during the connection.

If the telecommunication terminal 2 sends a service request III or IV, the mobile communication network 33, 34 can make a connection using either an analog or a digital channel. When service requests III and IV are used, a channel exchange between an analog and a digital channel is possible during the connection.

If a data connection is desired, service requests I and V can be used. Thus, the service request sent by the telecommunication terminal 2 to the mobile communication network 33, 34 is selected, among other things, on the basis of which operation modes are available in the mobile communication network 33, 34 and possibly also according to a selection made by the user or an application, if it is possible for the user or the application to select the operation mode. The connection options can advantageously be the following:

A. analog data only,

B. digital data only,

C. analog data preferred, but also digital data accepted, and

D. digital data preferred, but also analog data accepted.

If the option A is selected, the telecommunication terminal 2 sends a service request I. If an analog channel is not available in the mobile communication network 33, 34, the call attempt fails.

If the option B is selected, the telecommunication terminal 2 sends a service request V. If a digital channel is not available in the mobile communication network 33, 34, the call attempt fails.

If the option C is selected, the telecommunication terminal 2 sends a service request I, if an analog channel is available in the mobile communication network 33, 34. If an analog channel is not available in the mobile communication network 33, 34, the telecommunication terminal 2 sends a service request V. If the mobile communication network 33, 34 cannot assign a digital nor an analog channel for connection, the call attempt fails.

If the option D is selected, the telecommunication terminal 2 sends a service request V, if a digital channel is available in the mobile communication network 33, 34. If a digital channel is not available in the mobile communication network 33, 34, the telecommunication terminal 2 sends a service request I. If the mobile communication network 33, 34 cannot assign a digital data channel nor an analog channel for connection, the call attempt fails.

During a data connection, a channel exchange between a digital data channel and an analog channel is not possible. In case the mobile station used as the telecommunication terminal 2 moves during the data connection to an area where the operation mode used in the data connection is not possible, the data connection call is released.

Figure 2:
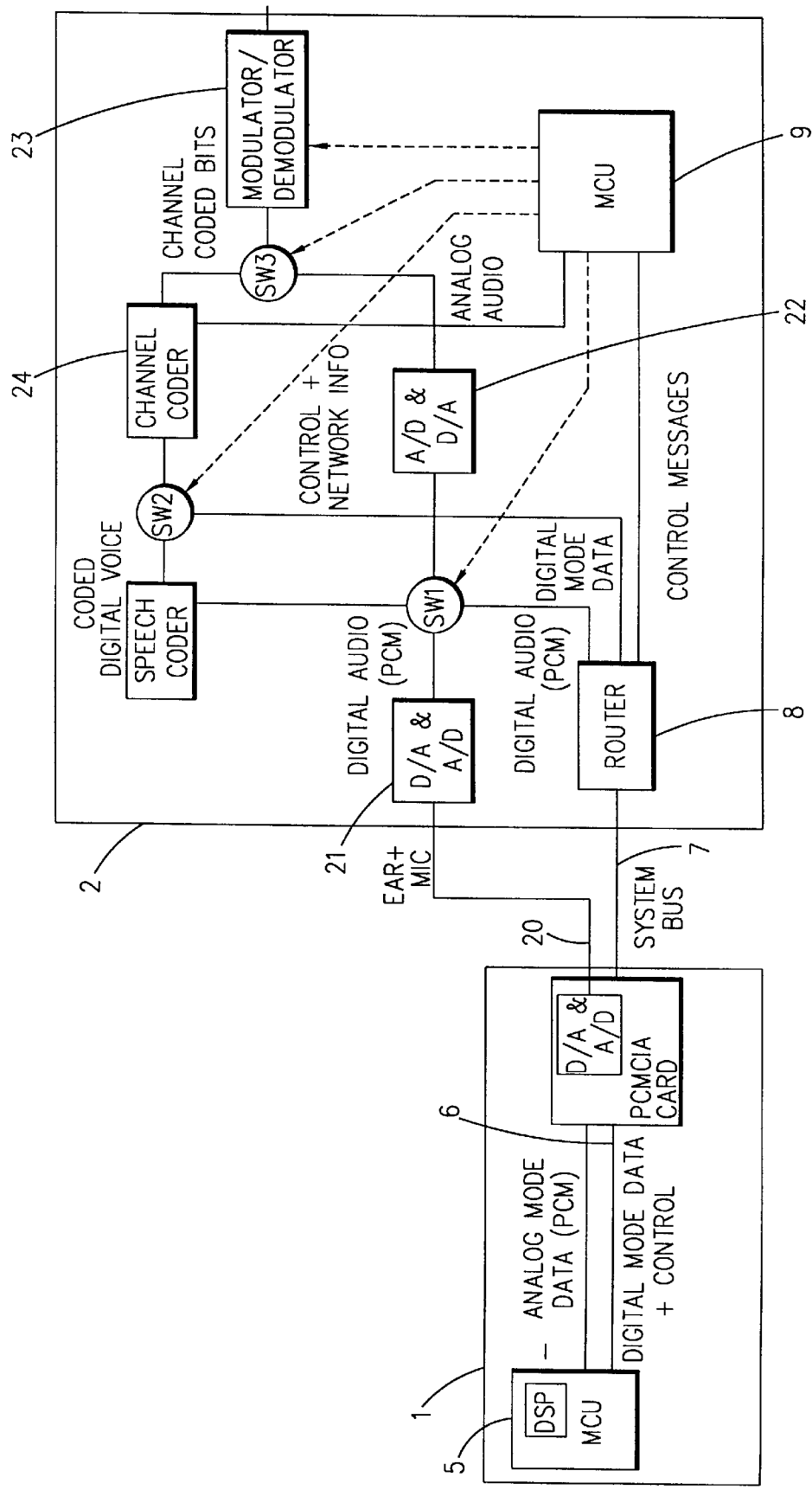
FIG. 2 shows an apparatus according to the first embodiment of the invention in a reduced block diagram.

FIG. 2 shows an apparatus implemented by the method according to the invention. The main parts of the apparatus are a computer 1, which in this embodiment is advantageously a portable computer, and a mobile station used as a telecommunication terminal 2 with two operation modes, the first operation mode being an analog operation mode and the second operation mode being a digital operation mode. A data adapter unit 3 is installed in connection with the computer 1 and it is advantageously a PCMCIA card and may comprise also a microcontroller. FIG. 2 is a block diagram of only the most important operations for implementing the method according to the invention. In the following, the formation of a data connection in a device of FIG. 2 will be described in more detail.

A processor block 5 is an important element in the operation of the computer 1, comprising e.g. a central processing unit MCU. The computer 1 can advantageously comprise also a digital signal processor chip DSP specially designed for signal processing. The operation of the computer 1 is usually based on an operating system controlling the operation of the software installed in the computer 1. The operation of a computer 1 is known to an expert in the field; consequently a more detailed description is unnecessary in this context.

Figure 10:
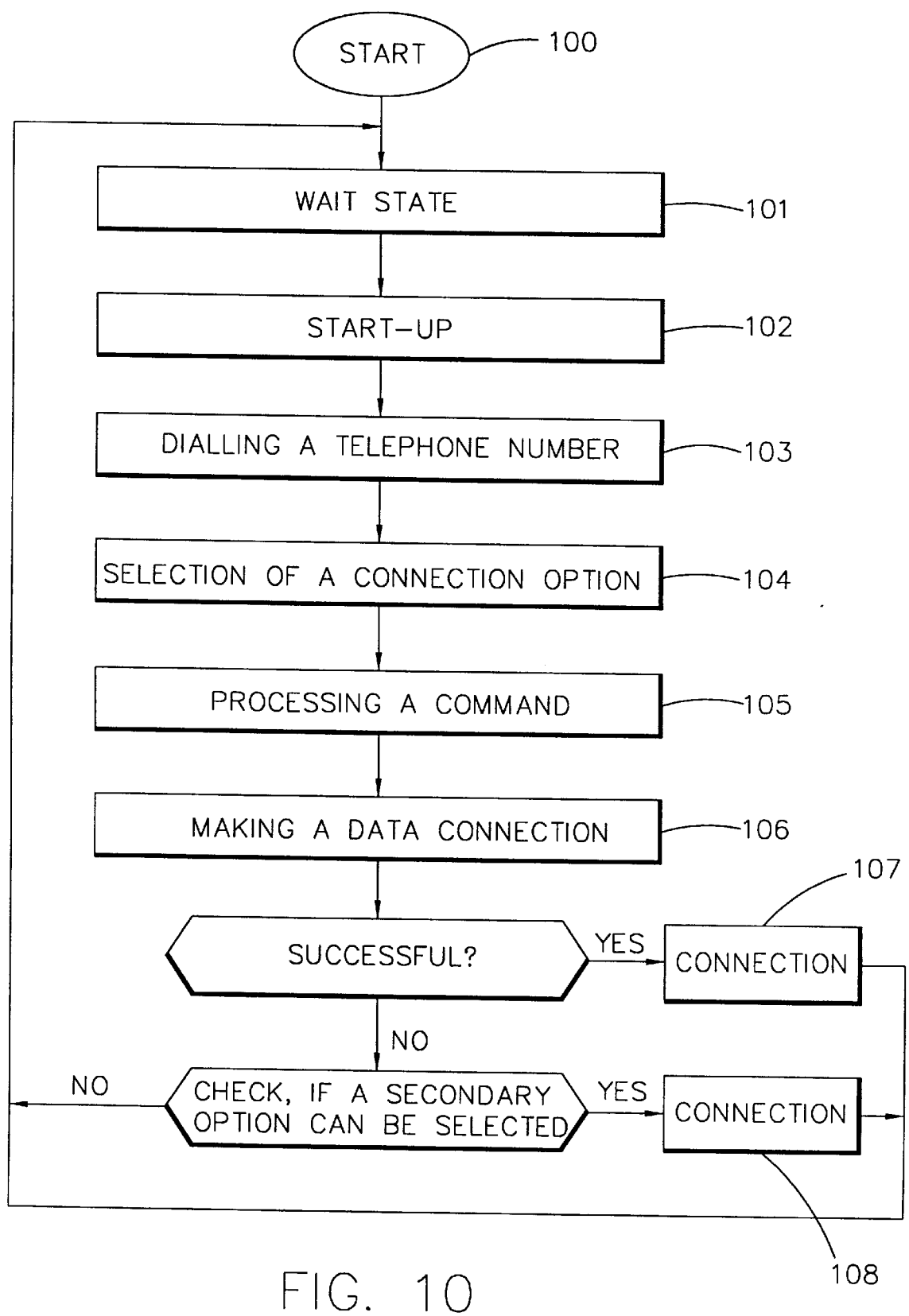
FIG. 10 illustrates the formation of a connection in a reduced block diagram.

FIG. 10 illustrates the formation of a data transmission connection in a reduced flow chart, which will be described in more detail below, with reference to FIG. 2. The signal level will be described below in connection with the description of FIGS. 11a and 11b. After turning the apparatus on (block 100), it turns into a wait state (block 101). The formation of a data transmission connection is started advantageously by an application being run in the computer 1. The start-up (block 102) can take place either upon selection by the user or automatically when a certain condition is fulfilled, such as at a predetermined moment of time. The formation of a data transmission connection is advantageously started by dialling a phone number (block 103), e.g. by AT commands used for controlling the data adapter, known as such. From the processor block 5, the dialling command and the data on the connection option A, B, C, D selected by the user or the application (block 104) is transmitted via a first control bus 6 to the data adapter unit 3. The data adapter unit 3 processes the command (block 105) and transmits it further via a system bus 7 to a router 8 located in the telecommunication terminal 2. The router 8 recognises the command as a command for dialling a phone number and transmits it further to a processor block 9 in the telecommunication terminal 2. The processor block 9 of the telecommunication terminal 2 comprises a processor unit, a read-only memory and a read/write memory, which is known to an expert in the field.

For making a data transmission connection (block 106), the telecommunication terminal 2 tests which mobile communication networks 33, 34 are available for making a connection, and which are the operation modes corresponding to them. If only a first mobile communication network 33, such as an analog mobile communication network, is available, a data transmission connection is made in the case that the telecommunication terminal 2, the user or the application has selected a data transmission A according to the first operation mode; primarily a data transmission A according to the first operation mode and secondarily a data transmission C according to the second operation mode; or primarily a data transmission according to the second operation mode and secondarily a data transmission D according to the first operation mode. In a corresponding manner, if only a second mobile communication network 34, such as a digital mobile communication network, is available, the data connection is made in case the telecommunication terminal 2, the user or the application has selected a data transmission B according to the second operation mode; primarily a data transmission according to the second operation mode and secondarily a data transmission D according to the first operation mode; or primarily a data transmission according to the first operation mode and secondarily a data transmission C according to the second operation mode.

If both the first mobile communication network and the second mobile communication network are available for making a connection, the data transmission connection is made according to the operation mode of primary option (block 107). If the data transmission connection is not successful according to the operation mode of primary option, an attempt is made to make a connection according to the operation mode of secondary option (block 108).

When the telecommunication terminal 2, the user or the application has selected the operation mode to be used in the data transmission connection, the processor block 9 of the telecommunication terminal 2 transmits data on the selected operation mode to the data adapter unit 3 and sets the data transmission connection of the telecommunication terminal 2 to correspond to the selected operation mode preferably by means of switches sw1, sw2, sw3. The data adapter unit 3 transmits data on the selected operation mode further to the processor block 5 of the computer 1. On the basis of this data, the processor block 5 starts data transmission by using a data transmission method suitable for the selected operation mode.

Figure 3:
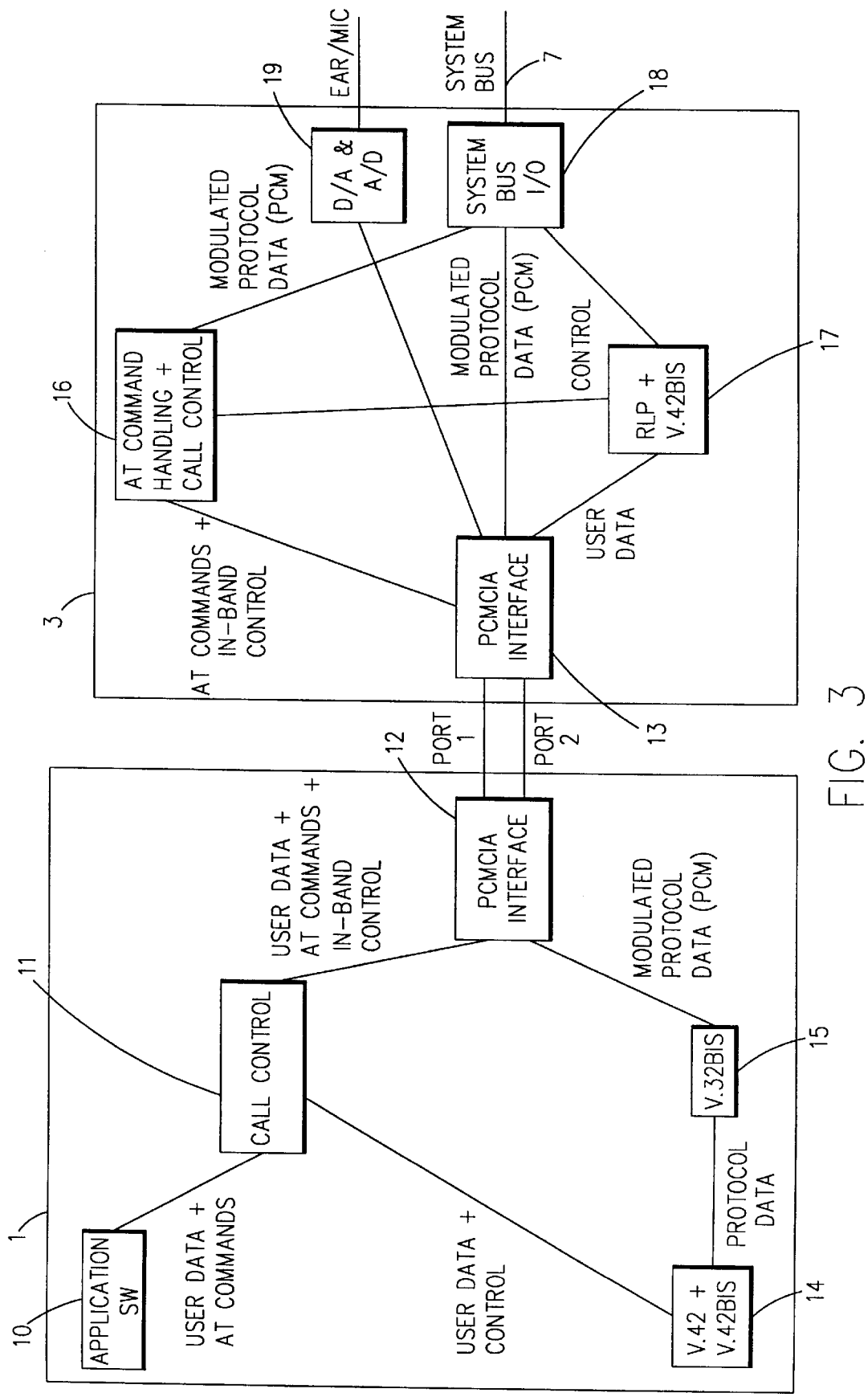
FIG. 3 illustrates the operation of an apparatus according to the first embodiment of the invention in a block diagram.

FIG. 3 is a block diagram on the operation of an apparatus according to the first embodiment of the invention, for the part of the computer 1 and the data adapter unit 3. The application block 10 is e.g. an ordinary terminal emulation program, by means of which the user can control the data transmission. From the application block 10, the data to be transmitted and the commands controlling the data transmission operation, such as AT commands, are transmitted to a command control block 11. If the second operation mode is used, the data to be transmitted and the AT commands are transmitted further to a first connection block 12, through which the data and the commands are moved to a second connection block 13 in the data adapter unit 3. When the first operation mode is used, the control commands are transmitted from the command control block 11 directly to the first connection block 12, but the data to be transmitted is conveyed from the command control block 11 to a first protocol block 14. The first protocol block 14 converts the data to be transmitted into data frames according to a predetermined data transmission protocol. Such protocols include V.42 and V.42bis. The data frames are transmitted into a modulation block 15, where a carrier wave is modulated by a pulse code modulation (PCM) known as such. The modulated signal is conveyed further to the first connection block 12 for transmission to the data adapter unit 3.

From the second connection block 13, the commands are transmitted to a command processing block 16 which interprets the commands and takes the measures corresponding to them, such as transmission of a service request to the telecommunication terminal 2 and further to the mobile communication network 33, 34. The command processing block 16 also controls the operation of a second protocol block 17, when the second operation mode is used. Thus, the data to be transmitted is conveyed from the second connection block 13 to the second protocol block 17, where the quantity of the data to be transmitted is reduced by compression and the reliability of data transmission is improved by adding error correction data to the data to be transmitted.

The data to be transmitted in digital form is conveyed from the second protocol block 17 to a first system bus connection block 18, through which the data is conveyed to the system bus 7 for transmission to the telecommunication terminal 2. If the first operation mode is used in data transmission, the data to be transmitted is conveyed from the second connection block 13 either to a first modulation block 19 or to the first system bus connection block 18. In the apparatus shown in FIG. 3, the data to be transmitted is at this stage pulse code modulated. In the first modulation block 19, the pulse code modulated signal is converted analog and transmitted to the telecommunication terminal 2 via an audio line 20. Thus, the signal is converted back to a pulse code modulated signal in a second modulation block 21 in the telecommunication terminal 2 and conveyed further to the first switch sw1 (FIG. 2). The pulse code modulated signal can also be conveyed via the first system bus connection block 18 to the system bus 7 and further to the router 8. From the router 8, the pulse code modulated signal is conveyed to the first switch sw1. Next, the pulse code modulated signal is conveyed to a third modulation block 22, where the pulse code modulated signal is converted to an analog audio signal. The analog audio signal is conveyed via the third switch sw3 to a modulator/demodulator block 23.

When the second operation mode is used in data transmission, the digital data coming from the system bus 7 and the router 8 is conveyed to the second switch sw2 and further to a channel coder 24. From the channel coder 24 the channel coded bytes are conveyed to the third switch sw3 and further to the modulator/demodulator block 23 for transmission into the mobile communication network 33, 34.

The processing block of the telecommunication terminal controls and configures the modulator/demodulator block 23 according to a selected operation mode. The modulator/demodulator block 23 modulates the signals to be transmitted from the telecommunication terminal 2 to a form suitable for the mobile communication network 33, 34. In a corresponding manner, the signals to be received from the mobile communication network 33, 34 are demodulated in the modulator/demodulator block 23.

Figure 5:
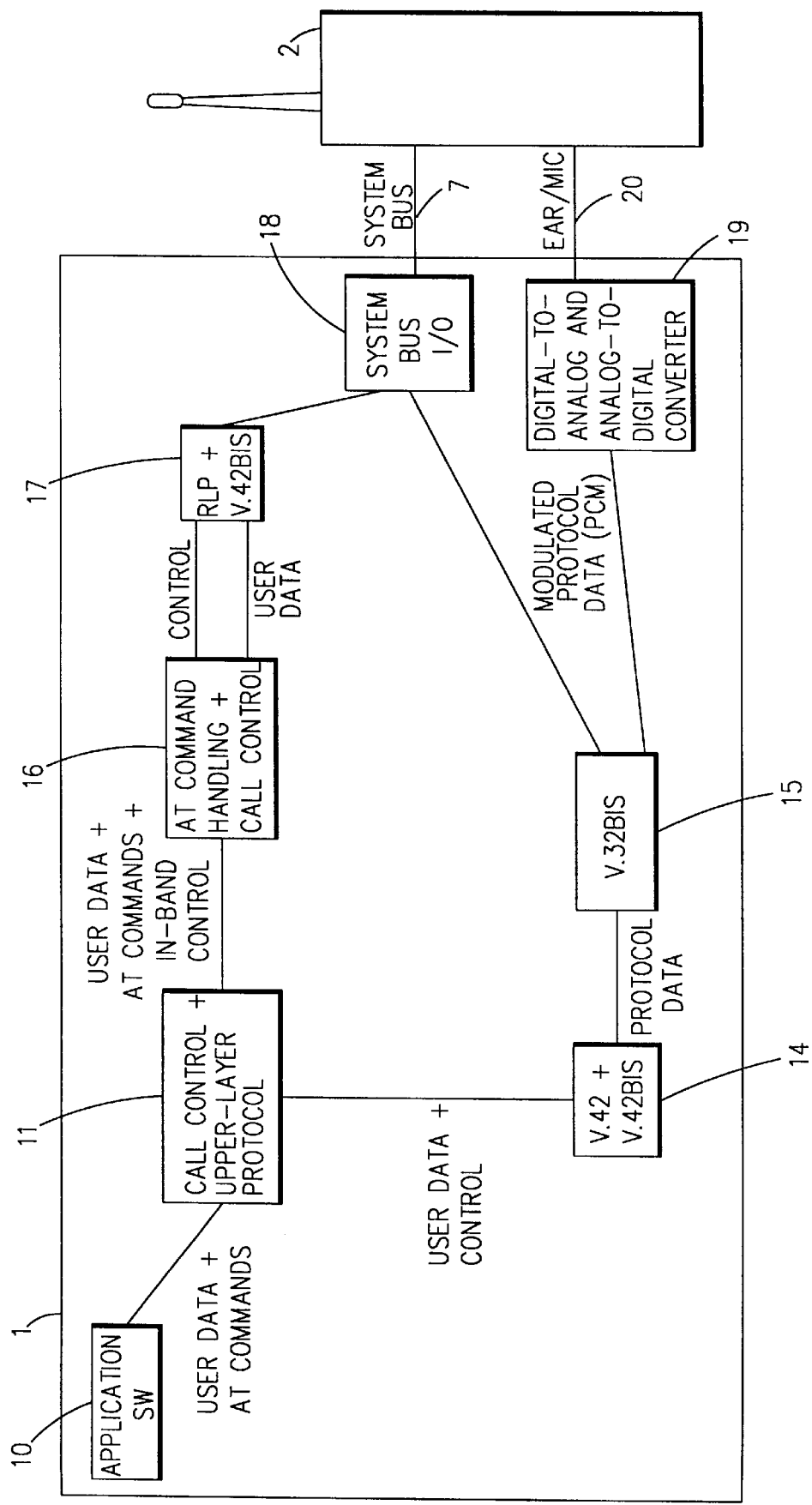
FIG. 5 illustrates the operation of an apparatus according to the second embodiment of the invention in a block diagram.

FIG. 5 is a block diagram on the operation of an apparatus according to the second, preferred embodiment of the invention, for the part of the computer 1. The application block 10 is e.g. an ordinary terminal emulation program, by means of which the user can control the data transmission. From the application block 10, the data to be transmitted and the commands controlling the data transmission operation, such as AT commands, are transmitted to a command control block 11. If the second operation mode is used, the data to be transmitted and the AT commands are transmitted further to a command processing block 16. When the first operation mode is used, the control commands are transmitted from the command control block 11 directly to the command processing block 16, but the data to be transmitted is conveyed from the command control block 11 to a first protocol block 14. The first protocol block 14 converts the data to be transmitted into data frames according to a predetermined data transmission protocol. Such protocols include V.42 and V.42bis. The data frames are transmitted into a modulation block 15, where a carrier wave is modulated by a pulse code modulation (PCM) known as such.

The command processing block 16 interprets the commands and takes the measures corresponding to them, such as transmission of a service request to the telecommunication terminal 2 and further to the mobile communication network 33, 34. The command processing block 16 also controls the operation of a second protocol block 17, when the second operation mode is used. Thus, the data to be transmitted is conveyed to the second protocol block 17, where the quantity of the data to be transmitted is reduced by compression and the reliability of data transmission is improved by adding error correction data to the data to be transmitted.

Figure 4:
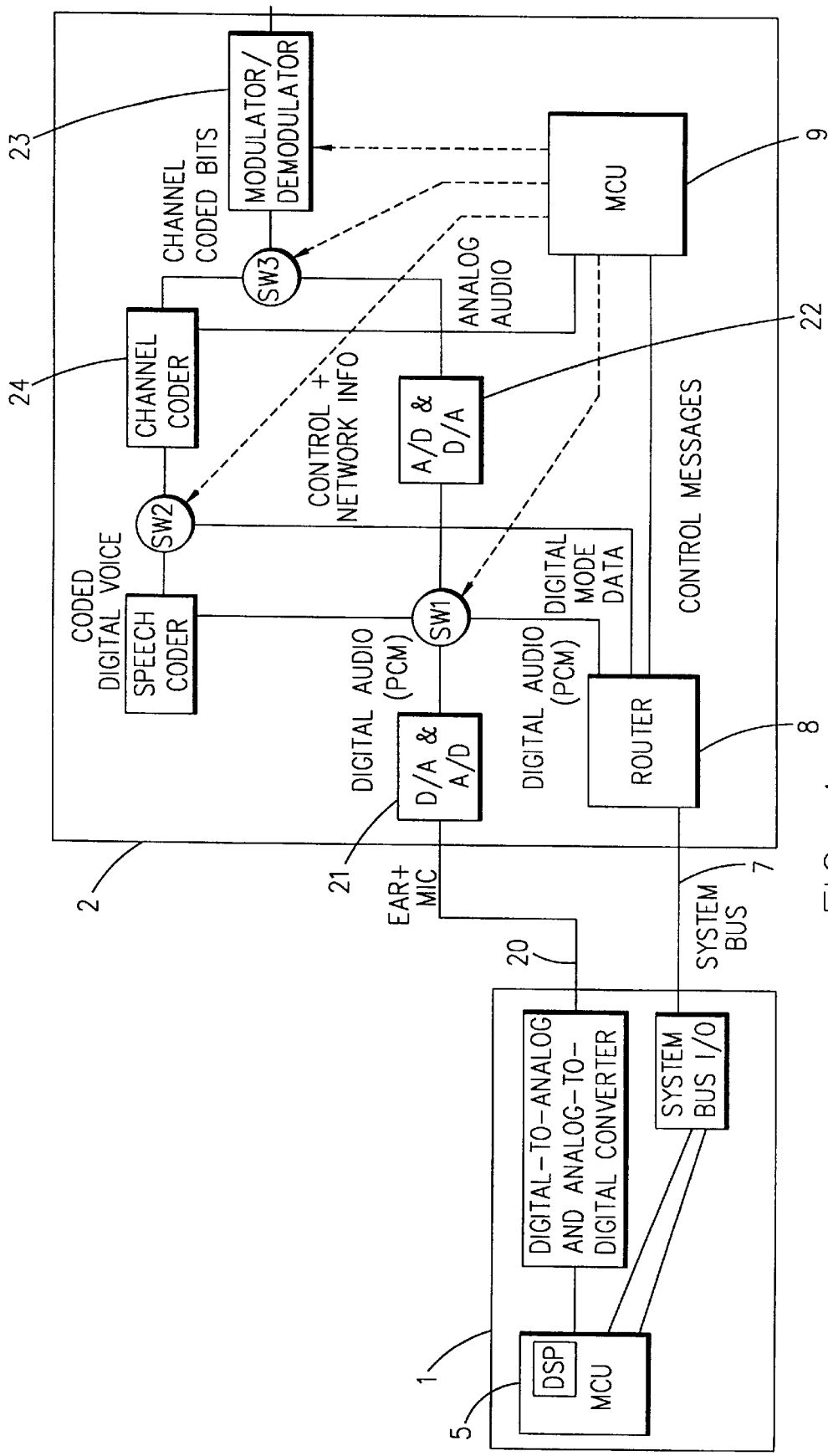
FIG. 4 shows an apparatus according to the second embodiment of the invention in a reduced block diagram.

The data to be transmitted in digital form is conveyed from the second protocol block 17 to a first system bus connection block 18, through which the data is conveyed to the system bus 7 for transmission to the telecommunication terminal 2. If the first operation mode is used in data transmission, the data to be transmitted is conveyed as a modulated signal either to a first modulation block 19 or to the first system bus connection block 18. In the apparatus shown in FIG. 5, the data to be transmitted is at this stage pulse code modulated. In the first modulation block 19, the pulse code modulated signal is converted analog and transmitted to the telecommunication terminal 2 via an audio line 20. Thus, the signal is converted back to a pulse code modulated signal in a second modulation block 21 in the telecommunication terminal 2 and conveyed further to the first switch sw1 (FIG. 4). The pulse code modulated signal can also be conveyed via the first system bus connection block 18 to the system bus 7 and further to the router 8. From the router 8, the pulse code modulated signal is conveyed to the first switch sw1. Next, the pulse code modulated signal is conveyed to a third modulation block 22, where the pulse code modulated signal is converted to an analog audio signal. The analog audio signal is conveyed via the third switch sw3 to a modulator/demodulator block 23.

When the second operation mode is used in data transmission, the digital data coming from the system bus 7 and the router 8 is conveyed to the second switch sw2 and further to a channel coder 24. From the channel coder 24 the channel coded bytes are conveyed to the third switch sw3 and further to the modulator/demodulator block 23 for transmission into the mobile communication network 33, 34.

The processing block of the telecommunication terminal controls and configures the modulator/demodulator block 23 according to a selected operation mode. The modulator/demodulator block 23 modulates the signals to be transmitted from the telecommunication terminal 2 to a form suitable for the mobile communication network 33, 34. In a corresponding manner, the signals to be received from the mobile communication network 33, 34 are demodulated in the modulator/demodulator block 23.

In the preferred, second embodiment of the invention, the first protocol block 14, the modulation block 15, and the second protocol block 17 are placed in the computer 1, wherein they can be implemented advantageously by using one or more processors. This corresponds the disposition shown later in table 9. Thus, the data adapter unit 3, the first connection block 12 and the second connection block 13 are not required, but the telecommunication terminal 2 is connected advantageously to the connections of the computer 1, for instance the system bus 7 to the series connection (RS-232C) and the audio line 20 to audio connection or telephone connection.

Figure 6:
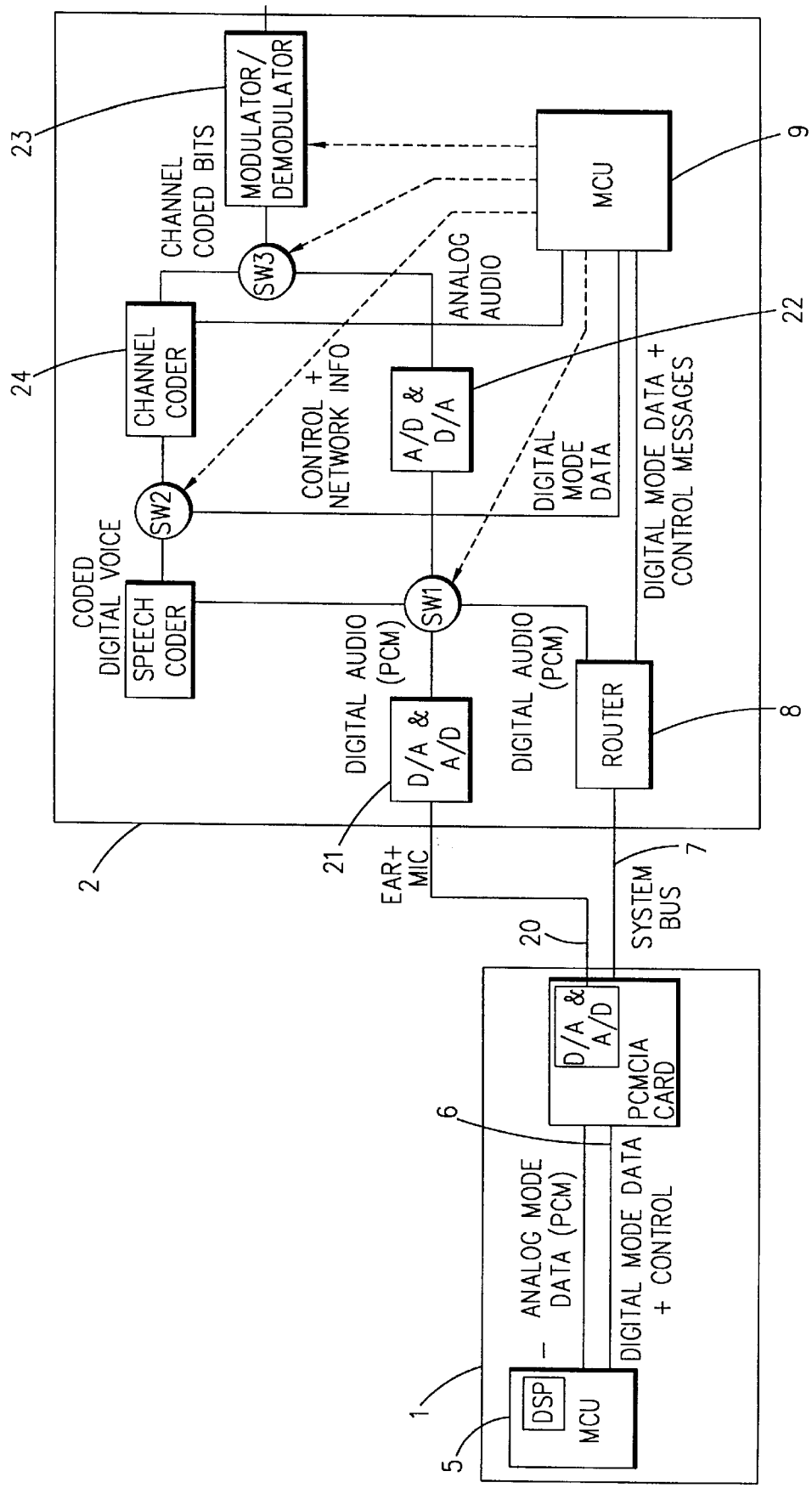
FIG. 6 shows an apparatus according to the third embodiment of the invention in a reduced block diagram.
Figure 7:
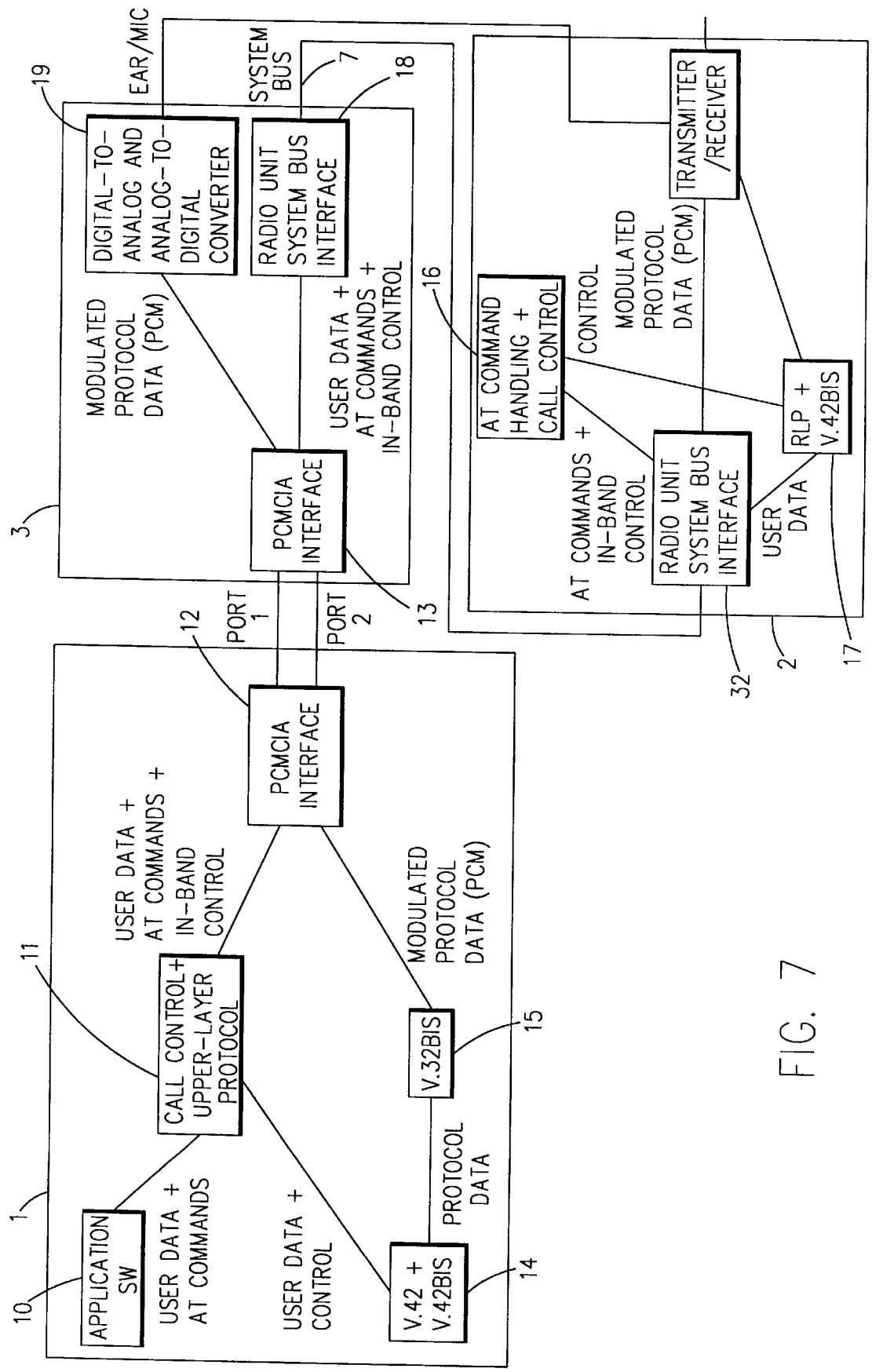
FIG. 7 illustrates the operation of an apparatus according to the third embodiment of the invention in a block diagram.

FIG. 6 shows the main elements of the apparatus according to a third embodiment of the invention, and FIG. 7 is a block diagram illustrating the operation of the apparatus according to the third embodiment of the invention. The difference to the first and second embodiment lies primarily in the fact that in the data to be transmitted in the second operation mode is processed mainly in the telecommunication terminal 2.

When the first operation mode is used, the operation of the apparatus of FIG. 6 corresponds to the operation of the apparatus of FIG. 2.

In the following, the operation according to the second operation mode will be described in an apparatus according to FIGS. 6 and 7.

From the application block 10, the data to be transmitted and the commands controlling the data transmission operation, such as AT commands, are conveyed to the command control block 11. If the second operation mode is used, the data to be transmitted and the control commands are conveyed further to the first connection block 12, through which data and the commands are moved to the second connection block 13 located in the data adapter unit 3.

From the second connection block 13, the commands are moved via the system bus connection block 18, the system bus 7, and a system bus connection block 32 of the telecommunication terminal to the command processing block 16, which interprets the commands and takes the measures corresponding to them, such as transmission of a service request to the mobile communication network 33, 34. The command processing block 16 controls also the operation of the second protocol block 17, when the second operation mode is used. Thus, the data to be transmitted is conveyed from the system bus connection block 32 of the telecommunication terminal to the second protocol block 17, where the quantity of the data to be transmitted is reduced by compression and the reliability of data transmission is improved by adding error correction data to the data to be transmitted.

The data to be transmitted in digital form is conveyed preferably from the second protocol block 17 located in the processor block 9 of the telecommunication terminal advantageously to the second switch sw2 (FIG. 6) and further to the channel coder 24. From the channel coder 24, the channel coded bytes are conveyed to the third switch sw3 and further to the modulator/demodulator block 23 for transmission to the mobile communication network 33, 34.

The modulator/demodulator block 23 modulates the signals to be transmitted from the telecommunication terminal 2 to a form suitable for the mobile communication network 33, 34. In a corresponding manner, the signals to be received from the mobile communication network 33, 34 are demodulated in the modulator/demodulator block 23.

In the example of FIG. 3, the modulation of the data to be transmitted in the first operation mode to a form corresponding to the operation mode is carried out in the computer 1, and the data to be transmitted in the second operation mode is modulated in the data adapter unit 3, whereby the first protocol block 14 and the modulation block 15 are placed in the computer 1 and the second protocol block 17 is placed in the data adapter unit 3, also indicated by letters "X" in Table 1. In the example of FIG. 7, the modification of data to be transmitted in the first operation mode into a form corresponding to the operation mode is conducted in the computer 1, and the data to be transmitted in the second operation mode is modified in the telecommunication terminal 2, whereby the first protocol block 14 and the modulation block 15 are placed in the computer 1 and the second protocol block 17 is placed in the telecommunication terminal 2, which is also indicated by letters "X" in the Table. Within the scope of the invention, the blocks can also be placed in another manner, as shown in the following Tables 1–10. The horizontal lines of the tables indicate the most important blocks for data modulation, i.e. the first protocol block 14, the modulation block 15 and the second protocol block 17. The vertical columns include the different location options for the blocks. The letter "X" indicates the position of the blocks.

TABLE 1

|  | Computer 1 | Data adapter unit 3 | Tele communication terminal 2 |
|---|---|---|---|
| First protocol block 14 | X | | |
| Modulation block 15 | X | | |
| Second protocol block 17 | | X | |

TABLE 2

|  | Computer 1 | Data adapter unit 3 | Tele communication terminal 2 |
|---|---|---|---|
| First protocol block 14 | | X | |
| Modulation block 15 | | X | |
| Second protocol block 17 | | | X |

TABLE 3

|  | Computer 1 | Data adapter unit 3 | Tele communication terminal 2 |
|---|---|---|---|
| First protocol block 14 | X | | |
| Modulation block 15 | X | | |
| Second protocol block 17 | | | X |

TABLE 4

|  | Computer 1 | Data adapter unit 3 | Telecommunication terminal 2 |
|---|---|---|---|
| First protocol block 14 | X | | |
| Modulation block 15 | | X | |
| Second protocol block 17 | | | X |

TABLE 5

|  | Computer 1 | Data adapter unit 3 | Telecommunication terminal 2 |
|---|---|---|---|
| First protocol block 14 | X | | |
| Modulation block 15 | | X | |
| Second protocol block 17 | | X | |

TABLE 6

|  | Computer 1 | Data adapter unit 3 | Telecommunication terminal 2 |
|---|---|---|---|
| First protocol block 14 | X | | |
| Modulation block 15 | | | X |
| Second protocol block 17 | | | X |

TABLE 7

|  | Computer 1 | Data adapter unit 3 | Telecommunication terminal 2 |
|---|---|---|---|
| First protocol block 14 | | X | |
| Modulation block 15 | | | X |
| Second protocol block 17 | | | X |

TABLE 8

|  | Computer 1 | Data adapter unit 3 | Telecommunication terminal 2 |
|---|---|---|---|
| First protocol block 14 | | | X |
| Modulation block 15 | | | X |
| Second protocol block 17 | | | X |

TABLE 9

|  | Computer 1 | Data adapter unit 3 | Telecommunication terminal 2 |
|---|---|---|---|
| First protocol block 14 | X | | |
| Modulation block 15 | X | | |
| Second protocol block 17 | X | | |

TABLE 10

|  | Computer 1 | Data adapter unit 3 | Telecommunication terminal 2 |
|---|---|---|---|
| First protocol block 14 | | X | |
| Modulation block 15 | | X | |
| Second protocol block 17 | | X | |

Figure 8:
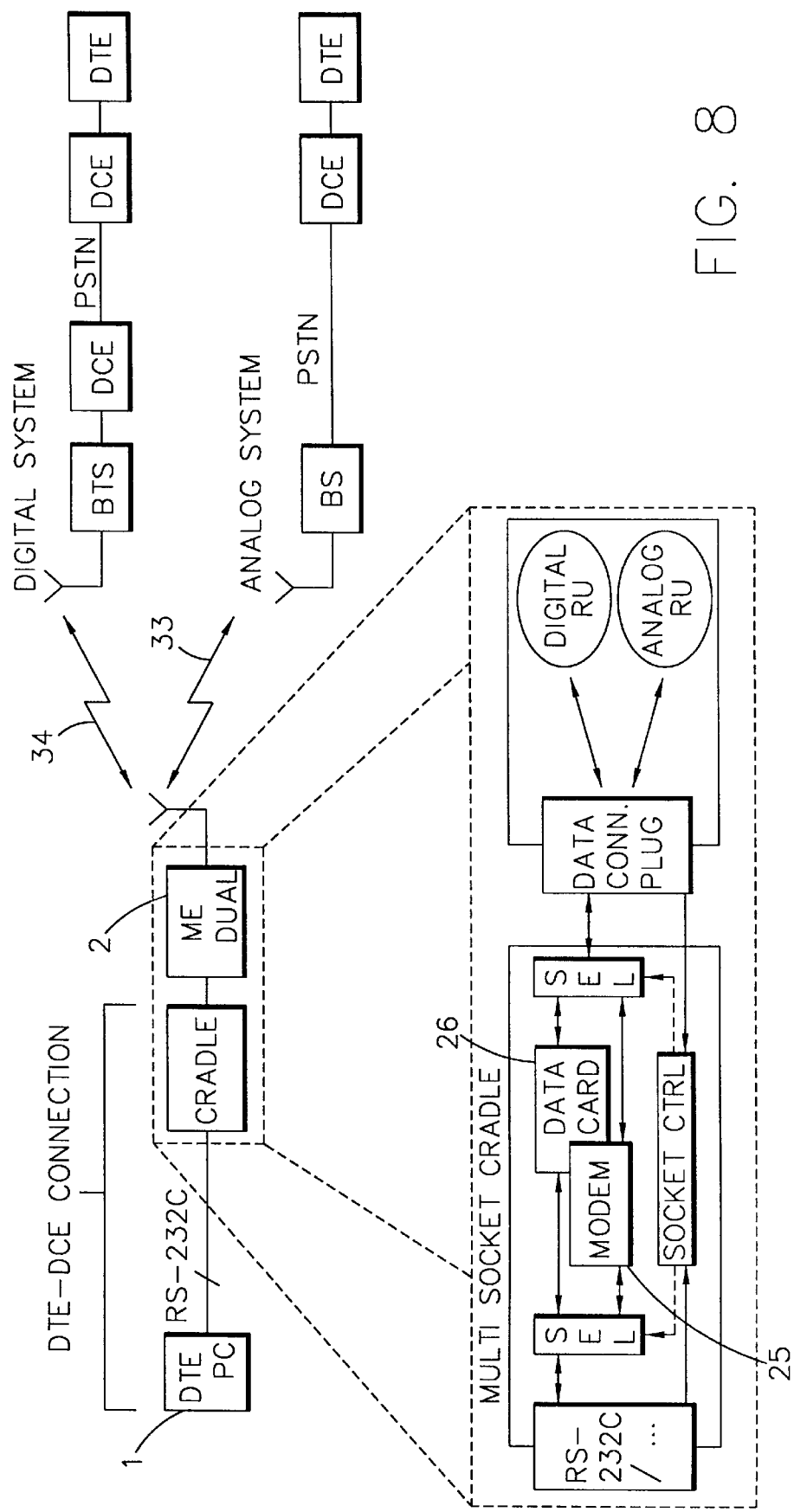
FIG. 8 shows an apparatus according to the fourth embodiment of the invention in a reduced schematic form.
Figure 9:
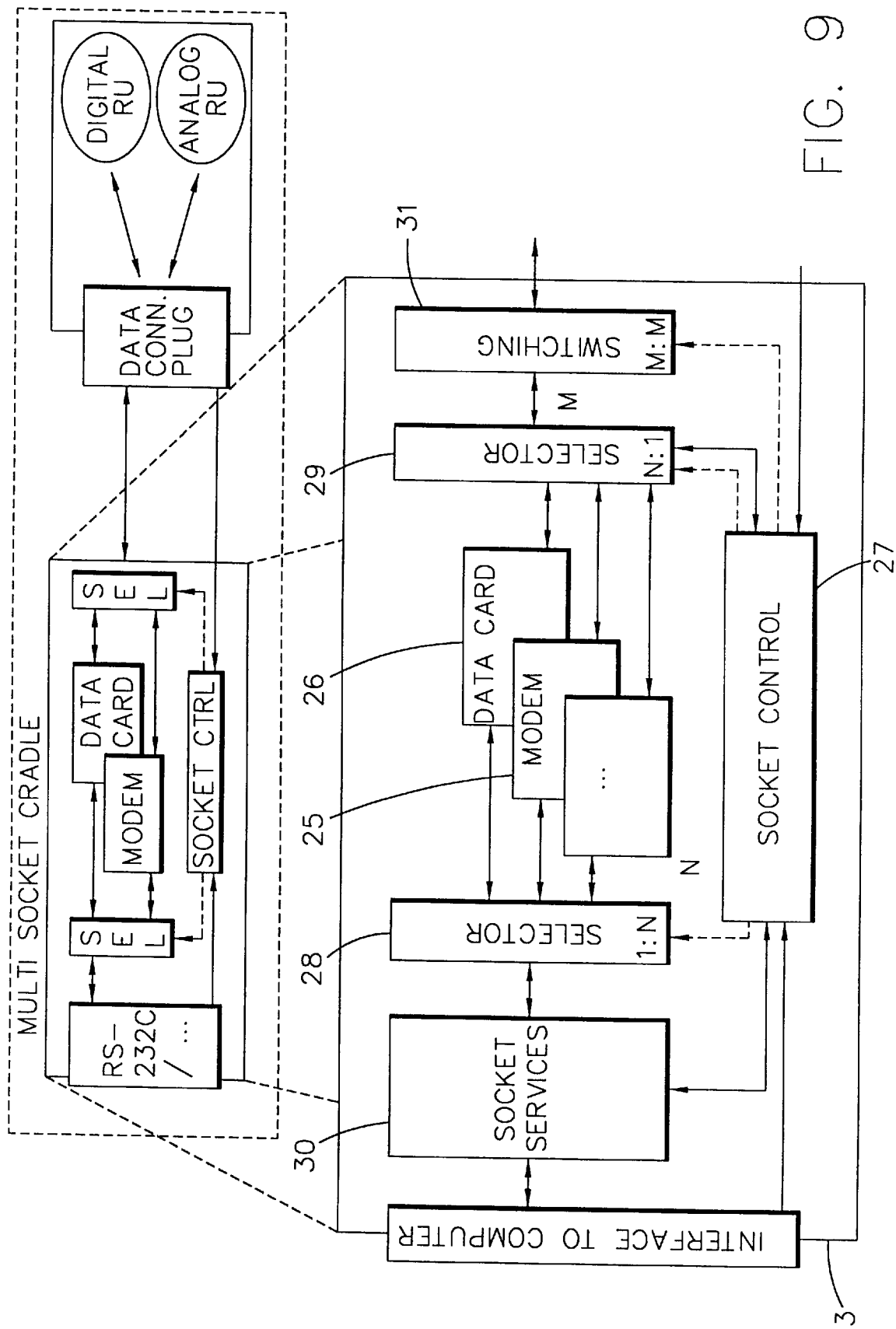
FIG. 9 shows the block diagram of a data adapter unit according to the fourth embodiment of the invention.

FIGS. 8 and 9 show a fourth advantageous embodiment of the invention, where the data adapter unit 3 is implemented with several separate data adapter cards which are each designed for a certain operation mode, such as a data adapter card 25 for an analog operation mode and a data card 26 for a digital operation mode. Also in this embodiment, the telecommunication terminal 2 tests which operation modes can be used in the mobile communication network 33, 34 and conveys information on the available operation modes to the data adapter unit 3. The data adapter unit 3 comprises a selection logic which sets the data adapter card corresponding to the selected operation mode in operation, whereby this data adapter card carries out conversion of the data to be transmitted to a form corresponding to the operation mode.

The selection logic consists advantageously of a first selector 28, a second selector 29 and a selector block 27 controlling the selectors. The selectors 28, 29 can be e.g. semiconductor switching circuits, whereby the durability of the selectors 28, 29 can be improved and the power consumption reduced in comparison with mechanical switches, such as relays. The selector block 27 receives control commands from both the computer 1 and the telecommunication terminal 2 and conducts selection according to these commands. The selector block 27 can consists of a microcontroller, known as such, and of peripheral circuits required for its operation, as is known to an expert in the field.

When an analog operation mode is used, the selector block 27 sets the data adapter card 25 in operation by switching the first and second selectors 28, 29 in a position where a data transmission connection is made from the computer 1 via the data adapter card 25 to the telecommunication terminal 2. In a digital operation mode, the selector block 27 sets the first and second selectors 28, 29 in a position where a data transmission connection is made from the computer 1 via the data adapter card 26 to the telecommunication terminal 2. In a fourth embodiment of the invention, the operation mode of the telecommunication terminal 2 is irrelevant for the computer 1, because the data adapter cards 25, 26 of the data adapter unit can process data received from the computer 1 and convert it to a form corresponding to the set operation mode.

The data adapter unit 3 according to FIGS. 8 and 9 comprises, in addition to the selection logic mentioned above, also a computer adapter block 30 for adapting the signal system between the computer 1 and the data adapter unit 3 to a form suitable for the data adapter unit 3. For example in a signal system according to the RS-232C standard, usually signals of ±12 V are used, and in TTL couplings, 0 V and 5 V are used. For such adaptations, numerous semiconductor circuits have been developed for easy implementation.

The data adapter unit 3 comprises the adaptation block 31 of the telecommunication terminal, for carrying out adaptation of the signal system between the data adapter unit 3 and the telecommunication unit 2, such as changing the voltage levels.

Also in the fourth embodiment of the invention, information can be conveyed from the computer 1 to the telecommunication terminal 2 about the preferred operation mode. This can be conducted advantageously by AT commands, as also presented in the first embodiment of the invention.

The data adapter unit 3, shown in FIG. 8 and in more detail in FIG. 9, can be a separate unit, whereby it comprises connectors both for linking the computer 1 e.g. according to the RS-232C standard, and connectors for linking the data adapter unit 3 with the telecommunication terminal 2. The fourth embodiment of the invention can also be implemented by placing the data adapter cards, such as the data adapter card 25 and the data card 26 with the computer 1, preferably with an internal accessory bus of the computer 1, which can be implemented e.g. according to the PCMCIA card standard. Thus, the first selector 28 and possibly also the selector block 27 are advantageously implemented in the software of the computer 1, whereby the data adapter unit 3 requires, in addition to the data adapter cards 25, 26, also adapter blocks 30, 31, the second selector 29 and the selector controlling block 27, for setting the data transmission connection according to the selected operation mode.

Although only two data adapter cards 25, 26 are shown in the data adapter unit 3 according to the fourth embodiment of the invention, it is possible within the scope of the present invention to use also several data adapter cards in connection with the data adapter unit 3. For example, a separate fax card can be used for making a connection for sending and receiving also facsimile copies.

The data adapter unit 3 according to the invention can be advantageously implemented also in a way that at least part of the operation modes are selected by the application, whereby e.g. the application in the processor unit of the data adapter unit comprises functional blocks corresponding to the different operation modes, whereby the blocks corresponding to the operation mode selected are applied for the time of the connection.

In the example of FIG. 8, also two mobile communication networks are shown. In the first mobile communication network 33, the first operation mode can be used, and in the second mobile communication network 34, the second operation mode can be used for data transmission. The first mobile communication network 33 comprises a first base station BS, which is linked with a landline mobile communication network PSTN. Also a second computer DTE is connected with the landline mobile communication network PSTN, via a data adapter DCE. The second mobile communication network 34 comprises a second base station BTS which is linked with the landline mobile communication network PSTN via a data adapter DCE. Also the second computer DTE is linked with the landline mobile communication network PSTN via the data adapter DCE.

In the following, a further example of making a connection will be presented in the apparatus according to the first embodiment shown in FIG. 3. At the beginning, the application block 10 sends an initialization command (ATD) for a call to the command control block 11, which transmits it further via the first connection block 12 and the second connection block 13 to the command processing block 16 which examines the sent command and takes the respective measures. In the case of a call initialization command, the command processing block 16 sends a request for forming a connection to the telecommunication terminal 2 via the system bus connection block 18. The request for forming a connection also includes a service request, such as an analog or digital connection. If the desired operation mode is available in the mobile communication network 33, 34 and a connection can be made between the telecommunication terminal 2 and the mobile communication network 33, 34, the telecommunication terminal 2 sends information on the connection to the command processing block 16. If the digital operation mode is used, the command processing block 16 controls the second protocol block 17 which conducts compression of the data to be sent and decompression of the data to be received. When the second protocol block 17 is ready for operation, the command processing block 16 sends information on the connection to the application block 10, whereby data transmission can be started. The route of data to be transmitted is, in the second operation mode, from the application block 10 via the command control block 11, the first connection block 12, and the second connection block 13 to the second protocol block 17 and further to the first system bus connection block 18. From here, the data is transmitted further via the system bus 7 to the telecommunication terminal 2 in which the data is transmitted in a manner described above in connection with a description of the operation of the telecommunication terminal 2, with reference to FIG. 2.

Data to be transmitted in the first operation mode is conveyed from the application block 10 via the command control block 11, the first protocol block 14, the modulation block 15, the first connection block 12, and the second connection block.13 either to the first modulation block 19 and further to the audio line 20, or via the first system bus connection block 18 to the system bus 7. Also the data route corresponding to the analog operation mode in the telecommunication terminal 2 is presented above in connection with the description of FIG. 2.

When a request for releasing the call is sent from the application block 10, the command processing block releases the connection by sending a request to the telecommunication terminal 2 for releasing the connection. When the call is released, the command processing block 16 sends information on this to the application block 10, after which the operation of the apparatus is returned to the wait condition to wait for commands or other impulses to be interpreted as commands from the computer 1 (FIG. 10).

Figure 11A:
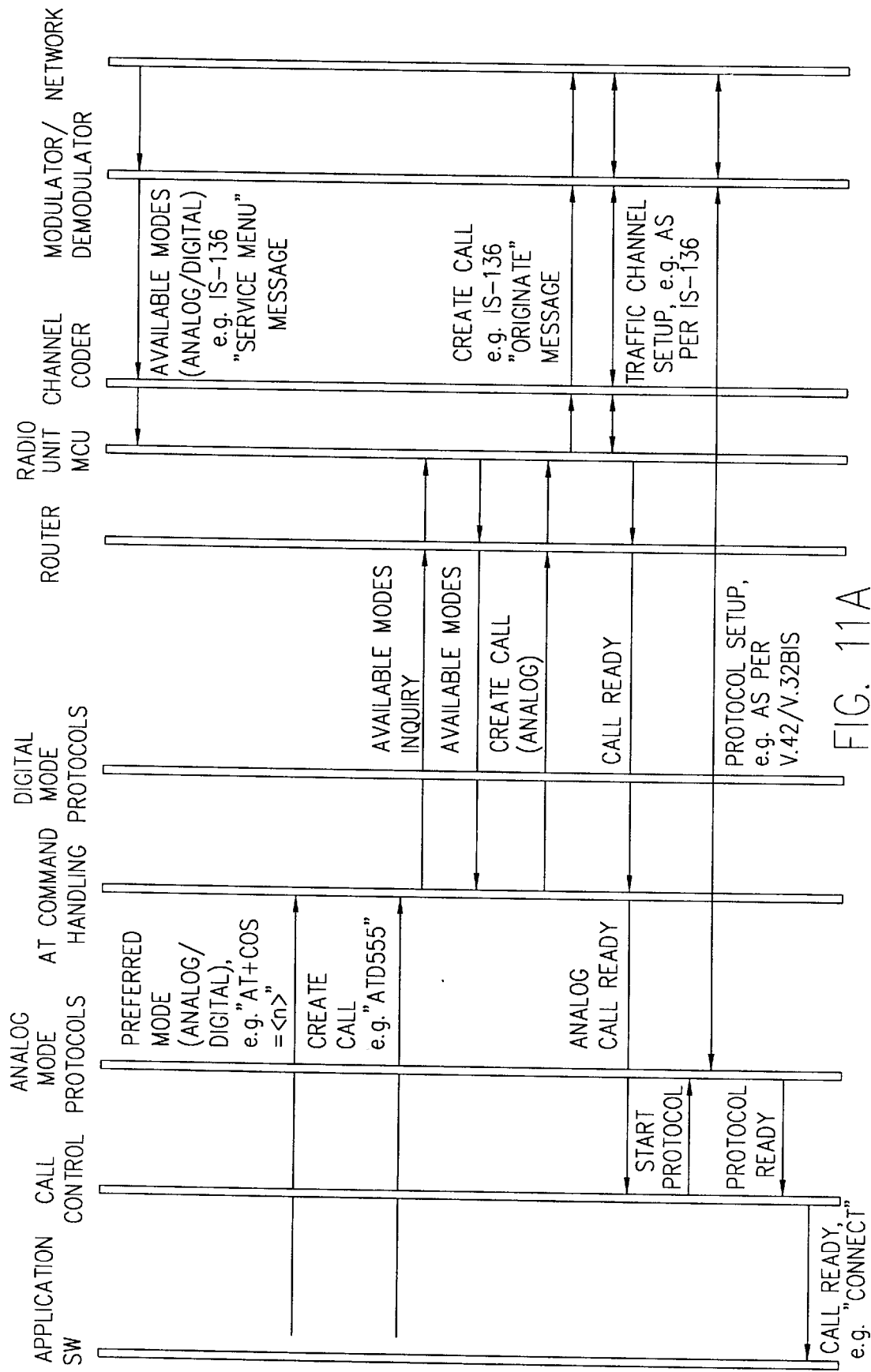
FIG. 11a is an arrow diagram illustrating the formation of a connection when an analog operation mode is used.
Figure 11B:
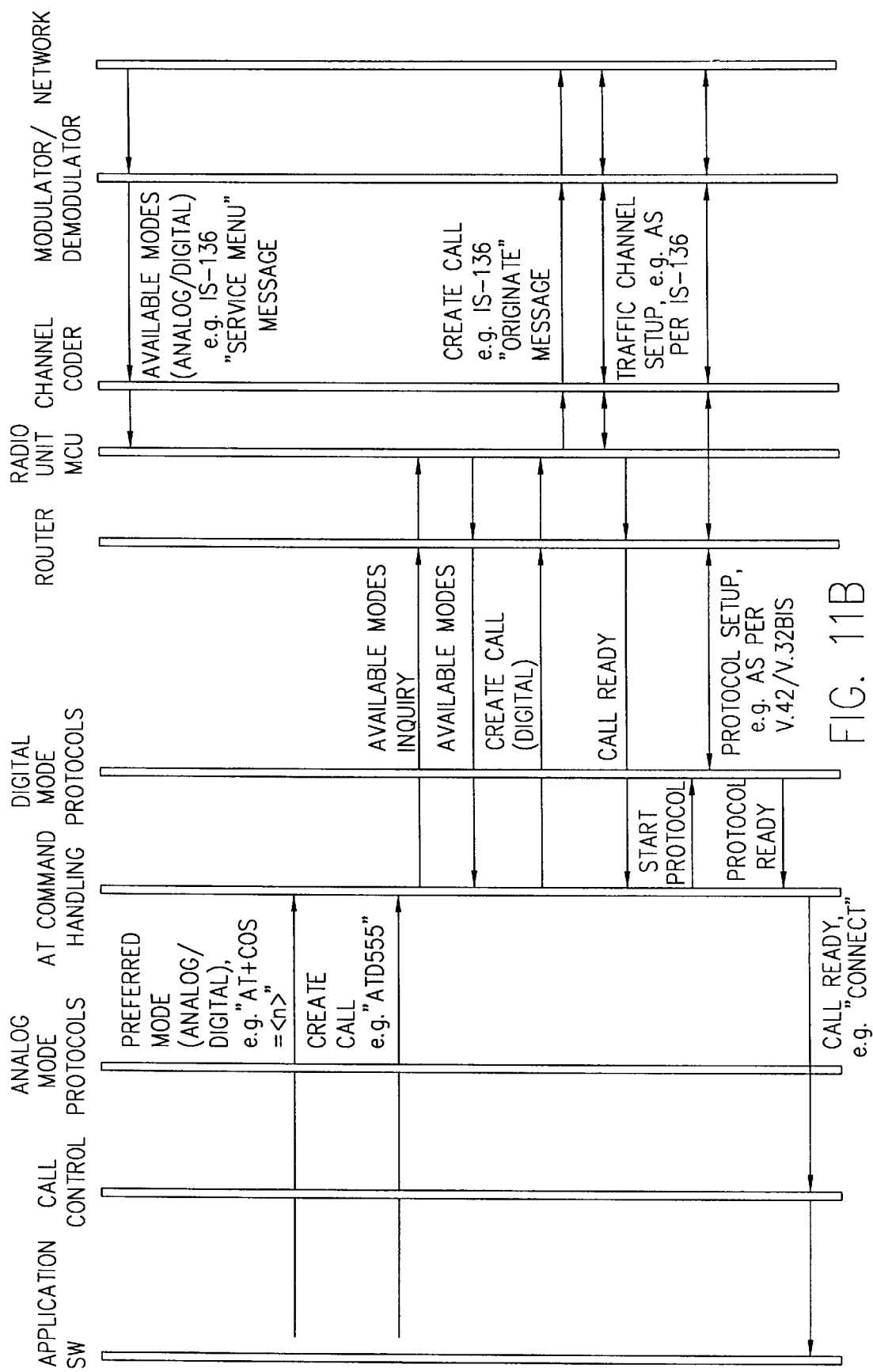
FIG. 11b is an arrow diagram illustrating the formation of a connection when a digital operation mode is used.

The connection is presented also as an arrow scheme, the case of the analog operation mode in FIG. 11a and the case of the digital operation mode in FIG. 11b. The telecommunication terminal 2 (radio unit MCU) receives information advantageously on those mobile communication networks 33, 34 which are available for connection from the telecommunication terminal, and the operation modes corresponding to them. After this the application SW sends information on the preferred operation mode and a command to dial a phone number for making a connection to the command processing block 16 (AT command handling). The command processing block 16 asks the telecommunication terminal 2, via the router 8, which operation modes can be used. After this, the command processing block 16 sends a request for making a connection corresponding to the selected operation mode (analog/digital) via the router 8 to the telecommunication terminal 2 which will make the connection to the communication network 33, 34 corresponding to the selected operation mode. When the connection is made, the telecommunication terminal 2 will send information on this via the router 8 to the command processing block 16. Next, the steps will be taken according to the selected operation mode.

If the first operation mode has been selected, which in this example is the analog operation mode, the command processing block 16 will send information on making a connection to the command control block 11 (call control), which will send an initialization command to the first protocol block 14 (analog mode protocols). The first protocol block 14, the modulator/demodulator block 23 and the first telecommunication network 33 will conduct initialization of the protocol, after which the first protocol block 14 will send information on conducted initialization to the command control block 11, which will send information on the connection to the application 10, after which data transmission from the computer 1 to the first mobile communication network 33 can be started.

If the second operation mode has been selected, which in this case is the digital operation mode, the command processing block 16 will send an initialization command to the second protocol block 17 (digital mode protocols). The second protocol block 17, the modulator/demodulator block 23 and the second telecommunication network 34 will conduct initialization of the protocol, after which the second protocol block 17 will send information on conducted initialization to the command processing block 16, from where information on the connection will be sent via the command control block 11 to the application 10, after which data transmission from the computer 1 to the second mobile communication network 34 can be started.

The invention is not restricted only to the embodiments presented above, but it can be modified within the scope of the appended claims.

We claim:

1. Method for making a data transmission connection from a computer to any one of a plurality of mobile communication networks for transmission of analog and/or digital signals, wherein the computer is connected with one of the mobile communication networks via a telecommunication terminal which is in local data transmission connection with the computer; and wherein the data transmission connection utilises at least a first operation mode for connection with a first of said telecommunication networks and a second operation mode for connection with a second of said telecommunication networks, the method comprising steps of:

testing said communication networks to determine which of said plurality of mobile communication networks are available for a connection to be made via the telecommunication terminal;

selecting one of the available mobile communication networks;

at the telecommunication terminal, setting an operation mode corresponding to the selected one of the mobile communication networks; and setting the data transmission connection for transmission via the selected operation mode.

2. Method according to claim 1, wherein said computer is connected to said telecommunication terminal by means of a data adapter unit.

3. Method according to claim 1, wherein said first operation mode is an analog operation mode and said second operation mode is a digital operation mode.

4. Method according to claim 3, wherein data transmission in said analog operation mode comprises at least the steps of:

converting the data to be transmitted into data frames according to a predetermined protocol; and using the data frames for modulating a carrier wave for forming a modulated signal and wherein data transmission in the digital operation mode comprises at least compressing the data to be transmitted by a predetermined compression method.

5. Method according to claim 4, wherein conversion of the data to be transmitted into data frames is conducted in the computer;

modulation of the carrier wave is conducted in said computer; and compression of the data to be transmitted is conducted in said data adapter unit.

6. Method according to claim 4, wherein:

conversion of the data to be transmitted into data frames is conducted in said data adapter unit, modulation of the carrier wave is conducted in said data adapter unit; and compression of the data to be transmitted is conducted in said telecommunication terminal.

7. Method according to claim 4, wherein:

conversion of the data to be transmitted into data frames is conducted in said computer;

modulation of the carrier wave is conducted in said computer; and compression of the data to be transmitted is conducted in said telecommunication terminal.

8. Method according to claim 4, wherein:

conversion of the data to be transmitted into data frames is conducted in said computer;

modulation of the carrier wave is conducted in said data adapter unit; and compression of the data to be transmitted is conducted in said telecommunication terminal.

9. Method according to claim 4, wherein:

conversion of the data to be transmitted into data frames is conducted in said computer;

modulation of the carrier wave is conducted in said data adapter unit; and compression of the data to be transmitted is conducted in said data adapter unit.

10. Method according to claim 4, wherein:

conversion of the data to be transmitted into data frames is conducted in said telecommunication terminal;

modulation of the carrier wave is conducted in said telecommunication terminal; and compression of the data to be transmitted is conducted in said telecommunication terminal.

11. Method according to claim 4, wherein:

conversion of the data to be transmitted into data frames is conducted in said computer;

modulation of the carrier wave is conducted in said computer; and compression of the data to be transmitted is conducted in said computer.

12. Method according to claim 4, wherein:

conversion of the data to be transmitted into data frames is conducted in said data adapter unit;

modulation of the carrier wave is conducted in said data adapter unit; and compression of the data to be transmitted is conducted in said data adapter unit.

13. Method according to claim 4 wherein modulation of the carrier wave is pulse code modulation (PCM).

14. Apparatus for making a data transmission connection from a computer to one of a plurality of mobile communication networks for transmission of analog and/or digital signals, said apparatus comprising:

a telecommunication terminal operative via a first operation mode for connection to a first of said mobile communication networks and operative via a second operation mode for connection to a second of said mobile communication networks;

a computer which is in local data transmission connection with said telecommunication terminal, and means for making a local data transmission connection between the computer and the telecommunication terminal;

means for testing said mobile communication networks to determine which of said communication networks are available for making a connection via said telecommunication terminal;

means for selecting an available one of said mobile communication networks for making the connection;

means for setting the telecommunication terminal in an operation mode corresponding to the selected mobile communication network; and means for setting the data transmission connection according to the selected operation mode.

15. Apparatus according to claim 14, wherein the first operation mode is an analog operation mode and the second operation mode is a digital operation mode.

16. Apparatus according to claim 14, further comprising means for forming data frames.

17. Apparatus according to claim 14, further comprising means for modulating data frames.

18. Apparatus according to claim 14, further comprising means for compressing data to be transmitted.

19. Apparatus according to claim 14, further comprising means for making a local data transmission connection in a wireless manner.

20. Apparatus according to claim 19, wherein the wireless data transmission connection is an infrared data transmission.

21. Apparatus according to claim 19, wherein the wireless data transmission connection is an electromagnetic data transmission connection.

22. Apparatus according to claim 14, wherein said computer is connected to the telecommunication terminal by means of a data adapter unit.

23. Apparatus according to claim 22, wherein said data adapter unit comprises one data adapter card (PCMCIA).

24. Apparatus according to claim 22, wherein said data adapter unit comprises at least two data adapter cards.

25. Apparatus according to claim 14, wherein said means for selecting an available mobile communication network for making a connection comprise a selector block, a first selector, a second selector and two or more data adapter cards.

* * * * *